United States Patent
Beck et al.

(10) Patent No.: US 7,633,683 B2
(45) Date of Patent: Dec. 15, 2009

(54) HEAD MOUNTED DISPLAY DEVICE

(75) Inventors: Klaus Beck, Singapore (SG); Günter Rudolph, Jena (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 12/073,592

(22) Filed: Mar. 7, 2008

(65) Prior Publication Data
US 2008/0239523 A1 Oct. 2, 2008

(30) Foreign Application Priority Data
Mar. 29, 2007 (DE) .................. 10 2007 016 138

(51) Int. Cl.
*G02B 27/14* (2006.01)
(52) U.S. Cl. ....................................... 359/630
(58) Field of Classification Search ................ 359/630; 349/11; 348/E13.036
See application file for complete search history.

(56) References Cited

U.S. PATENT DOCUMENTS

| | | | |
|---|---|---|---|
| 5,880,773 A | 3/1999 | Suzuki | |
| 6,747,611 B1 | 6/2004 | Budd et al. | |
| 6,903,875 B2 | 6/2005 | Achtner | |
| 6,945,648 B2 | 9/2005 | Schindler et al. | |
| 6,977,776 B2 | 12/2005 | Volkenandt et al. | |
| 2006/0164730 A1 | 7/2006 | Holler | |
| 2007/0091448 A1 | 4/2007 | Durner et al. | |

FOREIGN PATENT DOCUMENTS

JP  7-234375  9/1995

OTHER PUBLICATIONS

Office action of the German Patent Office Jul. 2007 (translation attached).

*Primary Examiner*—Jessica T Stultz
*Assistant Examiner*—Mahidere S Sahle
(74) *Attorney, Agent, or Firm*—Walter Ottesen

(57) ABSTRACT

An HMD device has an imaging optic for the right eye and an imaging optic for the left eye. Each imaging optic so images an image, which is generated in the object plane, that the image can be observed by a user in an image plane and each of the imaging optics includes an optical element (23) and a deflecting element (25) mounted downstream of the optical element (23). An image transducer (24) and the optical element (23), which follows the image transducer (24), are held by a linearly guided receptacle frame (15) moveable via a drive unit. A linear movement in the direction of an optical axis takes place. Adjusting wheels (4, 5) are mounted on respective sides of the image window for the right and left eyes. Each of the adjusting wheels (4, 5) is coupled mechanically to a corresponding cam curve. Each cam curve translates a rotational movement of the adjusting wheel (4, 5) into an output end linear movement of the receptacle frame (15).

3 Claims, 5 Drawing Sheets

HEAD MOUNTED DISPLAY DEVICE

CROSS REFERENCE TO RELATED APPLICATION

This application claims priority of German patent application no. 10 2007 016 138.9, filed Mar. 29, 2007, the entire content of which is incorporated herein by reference.

FIELD OF THE INVENTION

The invention relates to a head mounted display device (HMD device) having an imaging optic for the right eye and an imaging optic for the left eye. Each imaging optic so images an image, which is generated in the object plane, that a user can observe the image in an image plane. Each of the imaging optics includes an optical element and a deflecting element mounted downstream of the optical element.

BACKGROUND OF THE INVENTION

An imaging optic of this kind is disclosed, for example, in U.S. Pat. No. 6,903,875. The imaging optic for the display unit is computed for an emmetropic eye. A disadvantage is that a user whose eye is ametropic must make an ametropic correction.

The solution described in U.S. Pat. No. 6,977,776 uses an HMD device which is attached to a spectacles frame.

In United States patent publication 2006/0164730, the suggestion is made to attach the HMD device to the spectacle lens.

U.S. Pat. No. 6,945,648 describes an HMD device which includes a receptacle with which lenses of different corrective strength can be exchangeably held.

The wearing of the HMD device together with the spectacles is, however, often viewed as being unpleasant. The HMD device must either be adapted individually or special spectacle lenses must be held in supply which can be exchanged.

In each case, an ametropic correction is associated with considerable complexity insofar as this correction is even provided for.

U.S. Pat. No. 6,747,611 discloses an HMD device wherein an adjustment of the focus takes place with the aid of a knurled screw which is mounted laterally on the HMD device at the elevation of the spectacles frame. Illumination, microdisplay and a lens are displaced along their optical axes. It is a disadvantage that the knurled screws project at both sides of the head of the wearer.

An HMD device is described in U.S. Pat. No. 5,880,773 wherein an adjustment of the focus takes place via a knurled screw which is mounted on both sides of the nose above the eyes. The transmission of the movement of the knurled screw to a lens, which is to be displaced, takes place via a toothed wheel gear assembly which drives a cam gear which, in turn, moves the lens along the optical axis. The arrangement is technically complex.

A coarse adjustment and a fine adjustment for the focus adjustment are suggested in Japanese patent publication 07234375 A. The coarse and fine adjustments include displacement elements which project outwardly out from the HMD device above each eye. The arrangement is difficult to operate and is technically complex and has a comparatively large length expansion.

SUMMARY OF THE INVENTION

In view of the above, it is an object of the invention to provide an HMD device which is suitable for emmetropic users as well for different users whose eyes exhibit ametropia. It is a further object of the invention to provide such an HMD device which is of simple construction and is convenient to operate.

The HMD device of the invention includes: first and second imaging optical systems for the left and right eyes of a user wearing the device; a support frame defining first and second windows corresponding to respective ones of the first and second imaging optical systems for the left and right eyes of the user, respectively; each one of the imaging optical assemblies being adapted to so image an image formed in an object plane to permit the user to observe the image in an image plane with the eye corresponding thereto; each of the imaging optical systems including an optical element defining an optical axis and a deflecting element disposed downstream of the optical element; each one of the imaging optical systems further including an image transducer mounted upstream of the optical element and a receptacle frame for holding the image transducer and the optical element; the receptacle frame being linearly movably guided; each one of the imaging optical systems further including a drive unit for driving the receptacle frame so as to cause the optical element to be displaced along the optical axis; the drive units of the first and second imaging optical systems including respective adjusting wheels disposed next to corresponding ones of the first and second windows as viewed from the user; and, each of the drive units further including a cam mechanism for coupling the adjusting wheel to the receptacle frame so as to translate an input rotational movement of the adjusting wheel into an output linear movement of the receptacle frame.

The users of an HMD device can have different visual capacities. For this reason, the position of at least one optically effective component is configured to be adjustable along an optical axis for each eye of the user. The adjustment takes place by means of an adjusting wheel for each of the two eyes. One adjusting wheel is arranged to the right of the eyes and the other adjusting wheel is arranged to the left of the eyes and mounted on the HMD device so as to face toward the eyes. With each adjusting wheel, the at least one optically effective component is displaced along the optical axis via a cam gear.

In the HMD device, the dioptric equalization is preferably realized in that the movement of a receptacle frame, which holds the optical element together with an image transducer, is introduced via the cam gear which is formed on the manually operable adjusting wheel. The solution is especially simple and therefore cost effective.

The adjusting wheel is relatively large and is therefore easily accessible and easily manipulable. The introduction of force can be comfortably undertaken with two fingers or even with one finger. The manual operation is similar to the adjusting of a binocular. The focusing can be dimensioned to be very sensitive and precise with a suitable selection of the slope of the slot cam. The slope makes possible a minimal application of force for the adjusting movement. The solution realizes the function within a small structural space and few components which can be easily manufactured.

The transfer pin, which runs in the slot cam, can be configured to be resilient in its axial direction so that the spring force ensures a self locking. In addition, the transfer pin runs without play because of the pretensioning. On the curved path of the slot cam, nubs can be formed which signal to the user via higher force application or a noise, for example, the center position, stop positions or specific dioptric intervals.

The latching adjustment can also be realized via a detent spring on the adjusting wheel which acts against detent teeth on the frame.

The manually operable adjusting wheel can be separated from the cam wheel so that a slip clutch can be realized by the two parts. With the slip clutch, manual forces can be limited so that they cannot damage the highly sensitive optics or mechanics.

When configuring the slotted hole and the slot cam, it is to be noted that the limiting of the movement lies in the slot cam (not in the slotted hole and not in the receptacle frame) in order to avoid bending moments, which are too high, on the transfer pin or in the receptacle frame and its support parts. The translation of rotational angle to dioptric change can be linear.

Markings can be applied to the adjusting wheel which, for example, show the zero position, stop positions or dioptric increments. The adjusting wheel is ergonomically so configured that the rotational movement can be easily introduced with the fingers without slipping off or without high application of force. This is realized, for example, by designing the periphery of the adjusting wheel to have a nub contour, knurled contour or wave contour.

The adjusting wheel is configured with a snap hook on the insert shaft for simple assembly.

A metallic guide pin is used as a basis for a highly precise guidance of the receptacle frame made of plastic. The guide pin can be very precisely manufactured relatively easily and cost effectively. The receptacle frame holds the optically effective elements which make possible the dioptric compensation via the linear displacement (for example, display with background illumination and lens). As a pairing of materials for the guide, POM (receptacle frame) and steel (guide pin) can be used. The guide pin is cast into a base plate or is latched into the latter. The guide pin can be provided with a special surface treatment to optimize the slide characteristics.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
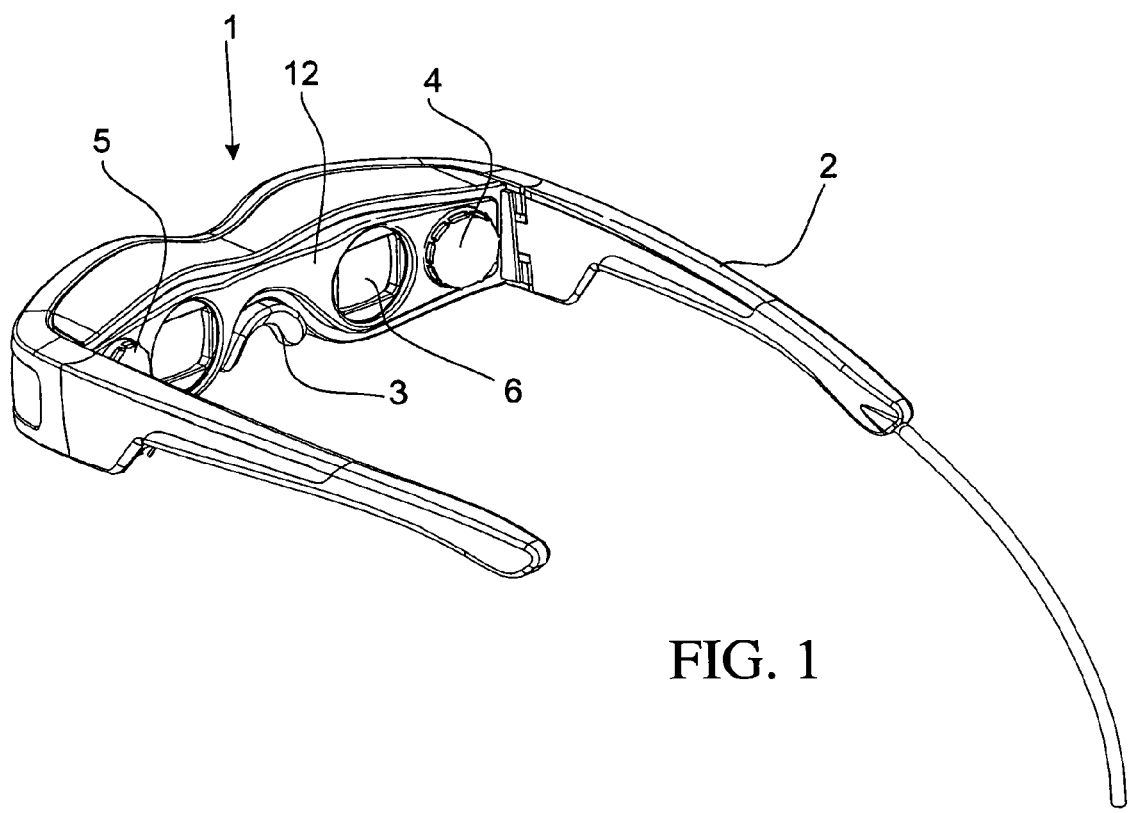
FIG. 1 is a perspective view of the HMD device equipped with adjusting wheels mounted on the user side.

FIG. 1 is a perspective view of an HMD device which is configured in the manner of spectacles. A support frame 12 supports respective pivotable temples 2 on the left and right sides and a nose bridge 3 is provided at the center of the frame 12. The frame 12 has respective image windows 6 for the right and left eyes of a viewer. A right adjusting wheel 4 is mounted between the right image window 6 and the right temple 2 and a left adjusting wheel 5 is mounted between the left image window 6 and the left temple 2. The ametropia of the right eye and of the left eye are individually compensated by actuating the right and/or left adjusting wheels (4, 5).

Figure 2:
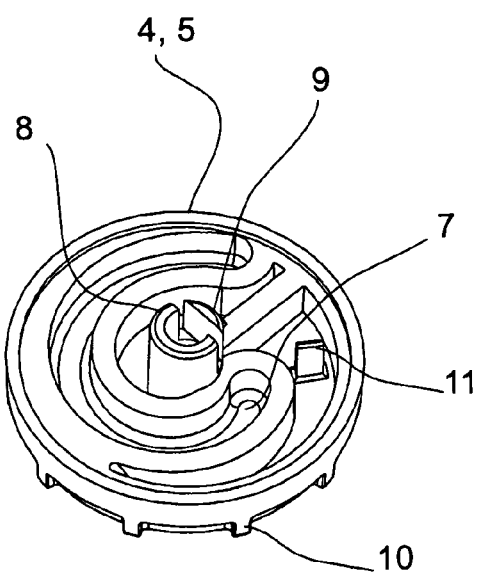
FIG. 2 is a detail view of one of the adjusting wheels.

FIG. 2 shows the configuration of the right and left adjusting wheels (4, 5) which are structurally the same. The adjusting wheel has a slotted insert shaft 8. A snap hook 9 projecting outwardly is mounted on a portion of the insert shaft 8. In addition, a slot cam 7 is machined into the adjusting wheel (4, 5) approximately 340° about the insert shaft 8 and the radius of curvature of this slot cam increases continuously. The outer edge of the adjusting wheel (4, 5) has nubs 10 in order to ensure a reliable actuation of the adjusting wheel (4, 5). Furthermore, a detent spring 11 is provided.

Figure 3:
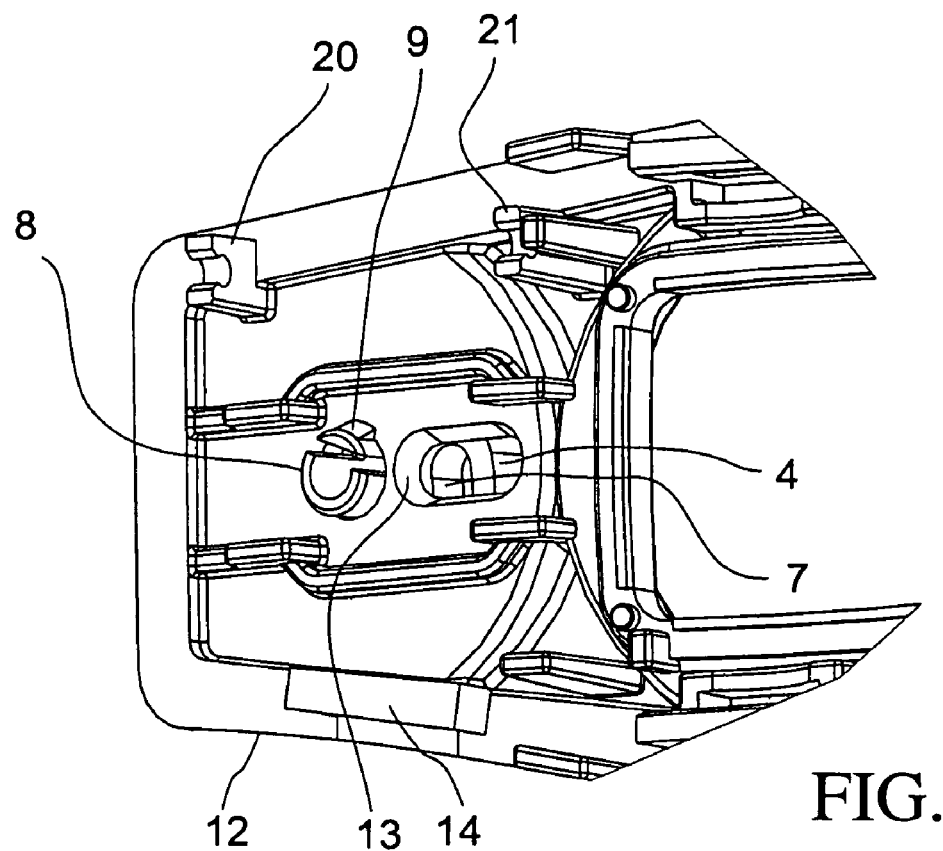
FIG. 3 is a partial view of the support frame with the adjusting wheel supported thereon.

FIG. 3 shows the left side (looking toward the user) of a frame 12 of the HMD device 1 with a mounted right adjusting wheel 4. The slot cam 7 of the adjusting wheel 4 can be seen through a slotted hole 13 disposed in the support frame 12. A bore is disposed in the support frame 12 into which the insert shaft 8 of the adjusting wheel 4 is inserted. The snap hook 9 secures the adjusting wheel 4 against the housing surface.

Figure 5:
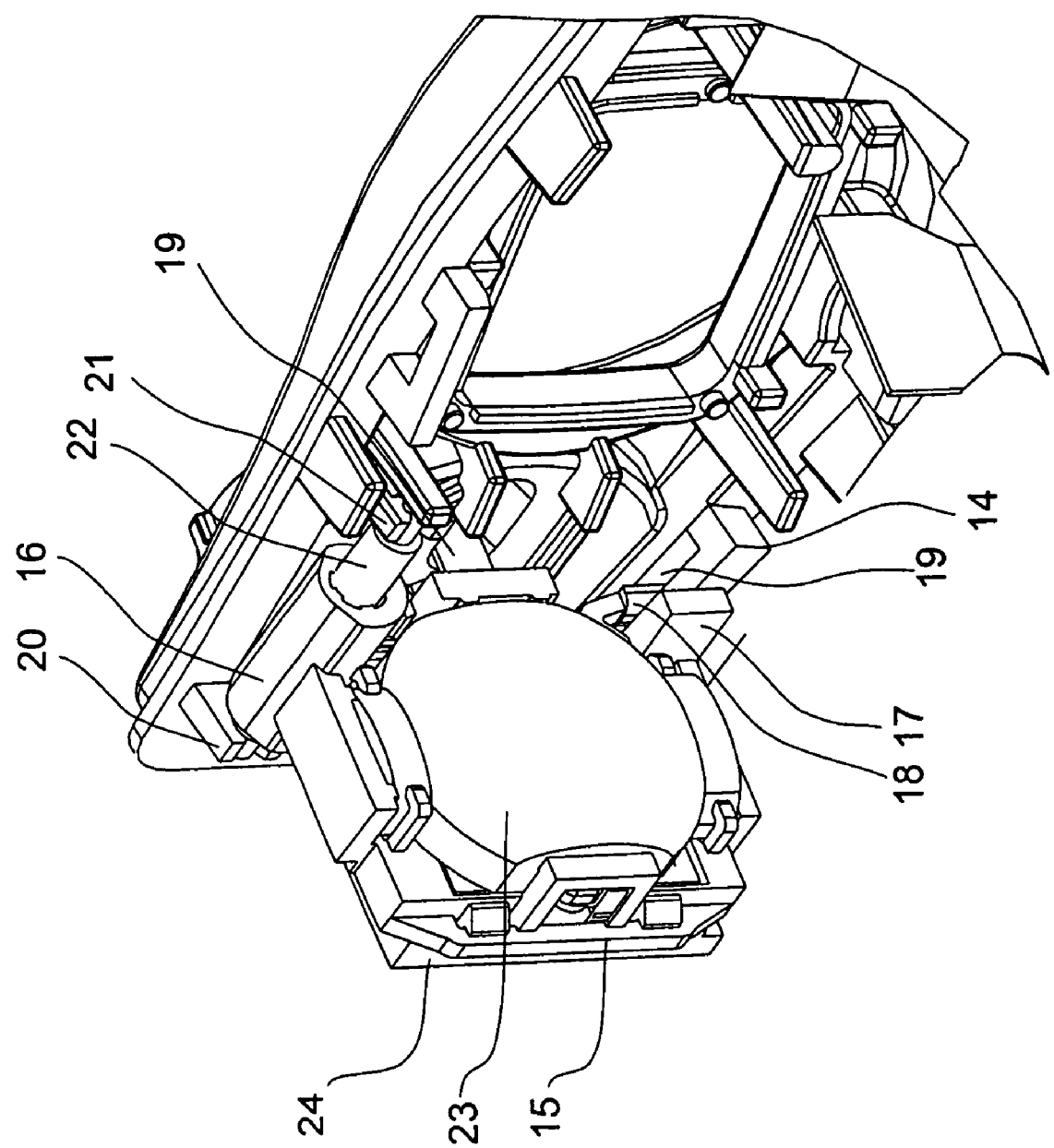
FIG. 5 is a partial perspective view of the support frame with the assembled image transducer and optical element.

Holding brackets (20, 21) receive a guide pin 22 and a guide rail 14 is clamped between a slide shoe 17 and a spring nose 18 (see FIG. 5).

Figure 4:
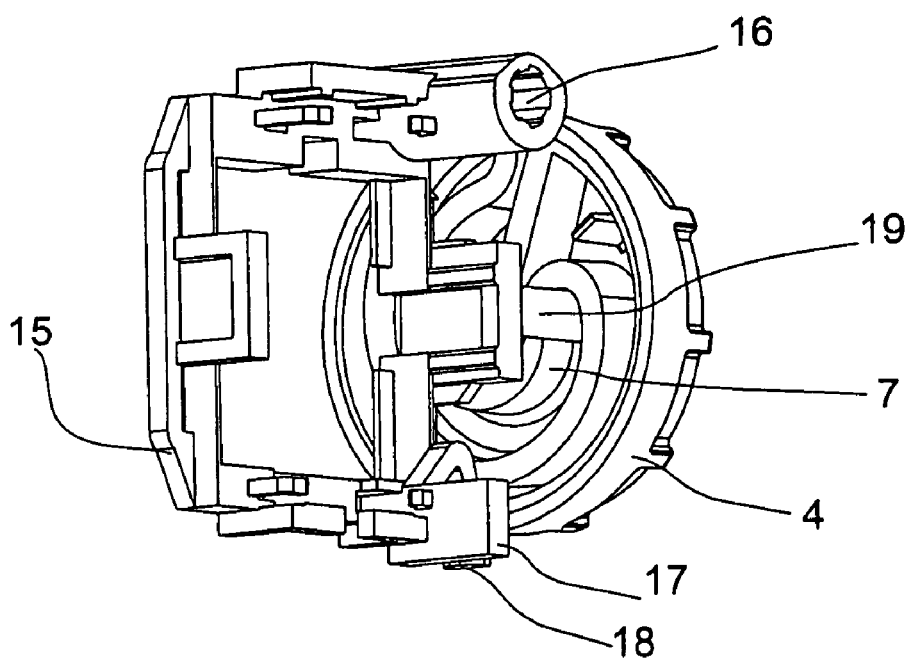
FIG. 4 is a detail perspective view of the adjusting wheel with the support frame.

FIG. 4 shows a view of the right adjusting wheel 4 in the assembled condition with a receptacle frame 15 (viewed toward the user and, to provide an overview, the support frame lying therebetween is not shown). For a linear guidance, the receptacle frame 15 has a guide bushing 16 on the upper right side and, on the lower right side, the receptacle frame has the slide shoe 17 on which the spring nose 18 is mounted.

A transfer pin 19 is mounted on the right side of the receptacle frame 15 approximately at the center and is directed toward the adjusting wheel 4. In the assembled state, the guide pin 19 engages through the elongated slot 13 (see FIG. 3) into the slot cam 7 of the adjusting wheel 4. When the adjusting wheel 4 is rotated, the transfer pin 19 slides in the slot cam 7 and the receptacle frame 15 is moved linearly on the support frame 12 (see FIG. 5) by the guide bushing 16, the slide shoe 17 and the spring nose 18.

FIG. 5 shows the parts described with respect to FIGS. 3 and 4 in the assembled state. Here, an image transducer 24 and an optical element 23 are additionally shown which are held in the receptacle frame 15. Furthermore, the guide pin 22 is shown which, on one end, is clamped into a holding bracket 20 of the support frame 12 and, at its other end, is clamped into a holding bracket 21.

In advance of assembly, the guide pin 22 is inserted into the guide bushing 16. The slide shoe 17 slides on an outer side of the guide rail 14 and the spring nose presses against an inner side of the guide rail 14.

Figure 6:
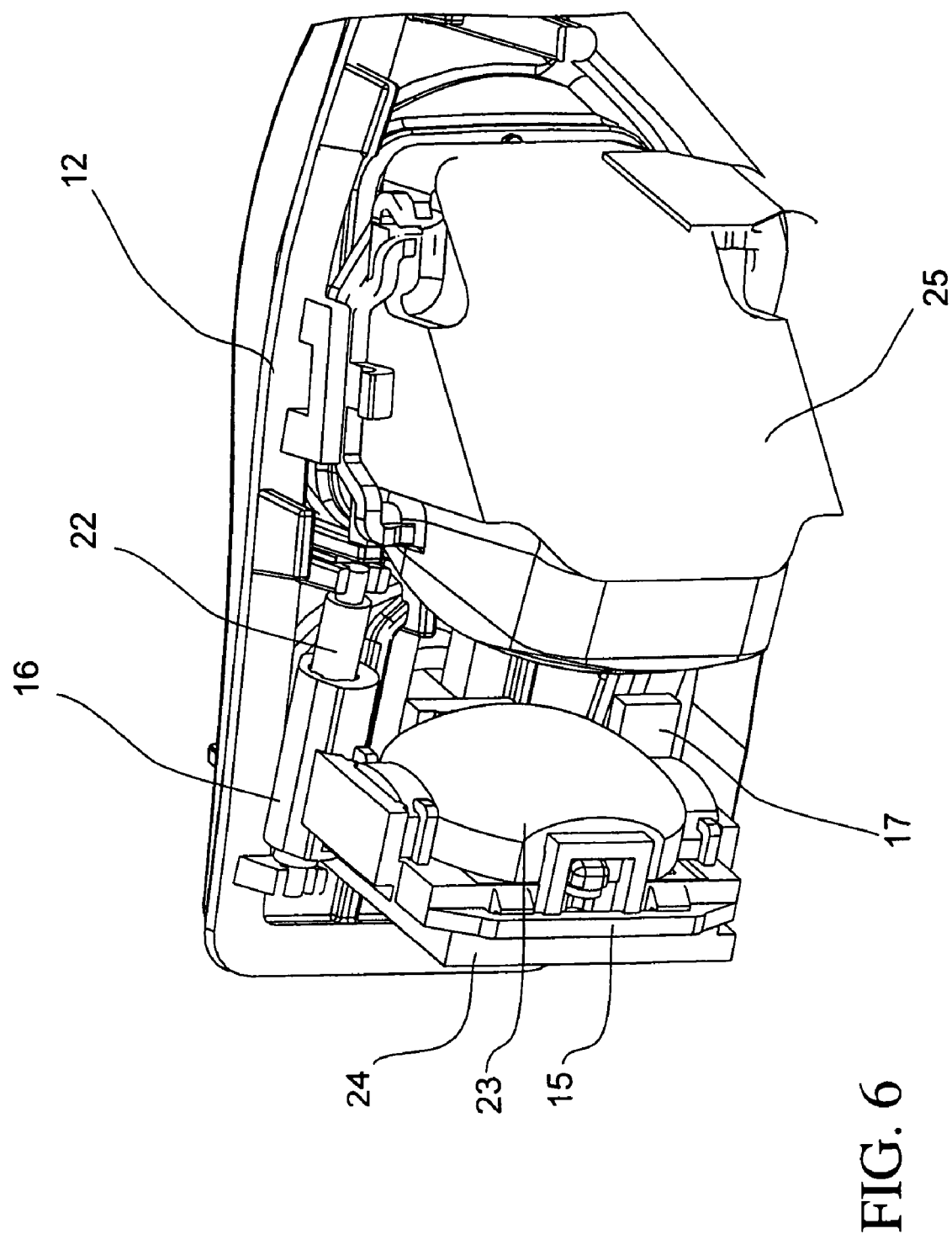
FIG. 6 is a partial perspective view of the mechanical configuration for one half of the HMD device; and, FIG. 7 is a partial view of the support frame without the adjusting wheel.

FIG. 6 shows the complete optical and mechanical assembly of the left side of the HMD device (viewed toward the user). The right side of the HMD device is assembled as a mirror image of the left side.

The image transducer 24 and the optical element 23 are held in the receptacle frame 15. A deflecting element 25 follows the receptacle frame 15 in the optical transmission path and directs an image, which is generated by the image transducer 24, into the right eye of the user.

The image transducer 24 is, for example, a type of OLED or LCD and the optical element 23 is a concave-convex lens having negative refractive power and the deflecting element 25 is a mirror or prism having positive refractive power. The image, which is generated by the image transducer 24, is observed as a virtual image by the eye of the user.

Figure 7:
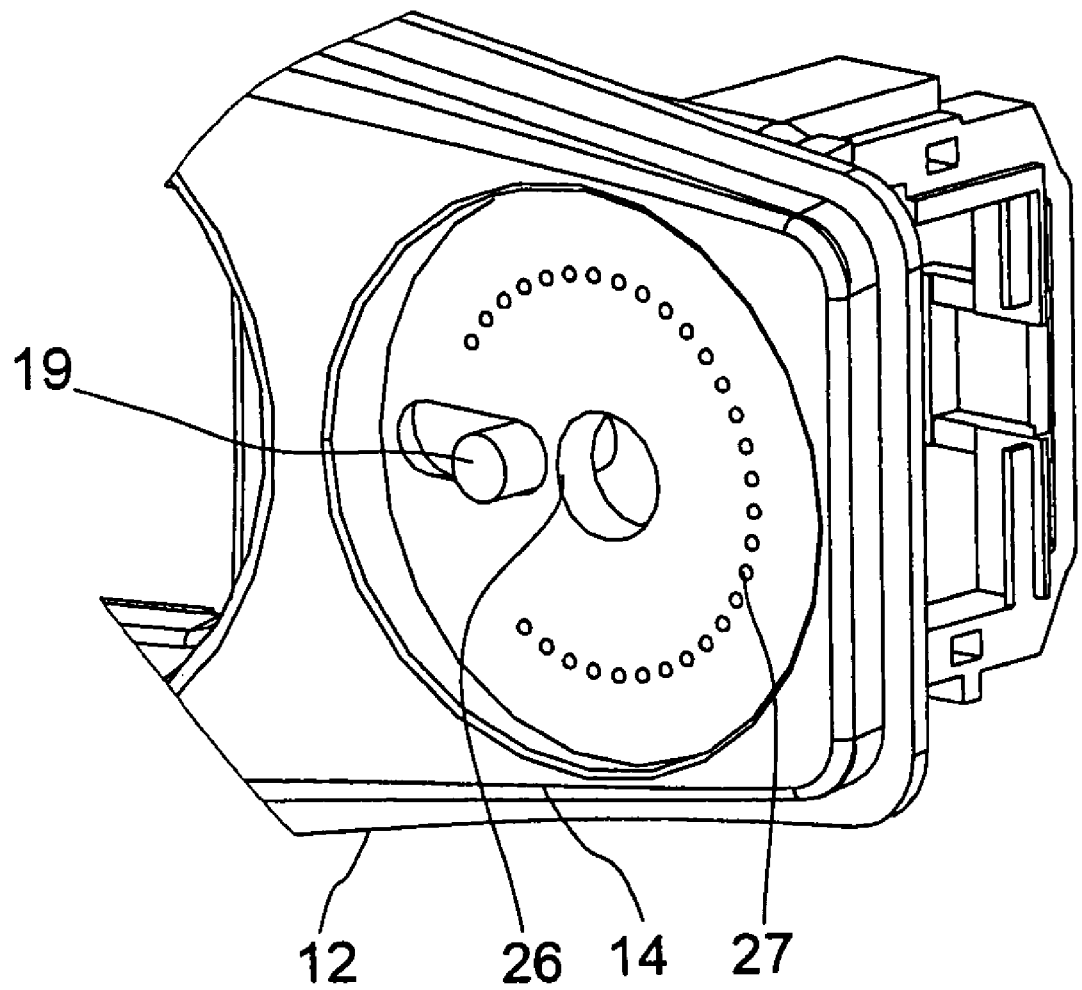

FIG. 7 is a perspective view of the support frame 12 as seen by the user. The right adjusting wheel 4 is not mounted. Detent teeth 27 are arranged radially about a rotational axis 26 of the adjusting wheel 4. The detent teeth 27 coact with a detent spring 11 (see FIG. 2) as a detent adjustment aid.

It is understood that the foregoing description is that of the preferred embodiments of the invention and that various changes and modifications may be made thereto without departing from the spirit and scope of the invention as defined in the appended claims.

LIST OF REFERENCE NUMERALS

1 HMD device
2 Temple
3 Nose bridge
4 Right adjusting wheel
5 Left adjusting wheel
6 Image window
7 Slot cam
8 Insert shaft
9 Snap hook
10 Nubs
11 Detent spring
12 Support frame
13 Slotted hole
14 Guide rail
15 Receptacle frame
16 Guide bushing
17 Slide shoe
18 Spring nose
19 Transfer pin
20 Holding bracket
21 Holding bracket
22 Guide pin
23 Optical element
24 Image transducer
25 Deflecting element
26 Rotational axis
27 Detent teeth

What is claimed is:

1. An HMD device comprising:

first and second imaging optical systems for the left and right eyes of a user wearing said device;

a support frame having a first side facing away from the user and a second side facing toward the user and defining first and second windows corresponding to respective ones of said first and second imaging optical systems for the left and right eyes of said user, respectively;

each one of said imaging optical systems being adapted to so image an image formed in an object plane to permit said user to observe said image in an image plane with the eye corresponding thereto;

each one of said imaging optical systems including an optical assembly linearly movably guided along said support frame on said first side thereof and laterally of the window in said support frame corresponding to the optical system;

each of said optical assemblies including an optical element defining an optical axis and said optical element being held in said optical assembly so as to prevent a rotation of said optical element about said optical axis when said optical assembly is moved linearly along said support frame in the direction of said optical axis;

each one of said optical assemblies including an image transducer fixedly mounted thereon upstream of the optical element;

each of said optical systems further including a deflecting element disposed on said first side of said support frame downstream of said optical element to deflect said optical axis through the window corresponding to the optical system and toward the corresponding eye of the user;

each one of said imaging optical systems further including a drive unit for driving said optical assembly so as to cause said optical assembly to be displaced on said support frame along said optical axis;

the drive units of said first and second imaging optical systems including respective adjusting wheels mounted on said second side of said support frame and disposed next to corresponding ones of said first and second windows as viewed from said user;

each of said adjusting wheels and the optical assembly corresponding thereto conjointly defining a cam interface at said support frame; and, each of said drive units further including an essentially two-dimensional, flat cam mechanism at said cam interface for coupling the adjusting wheel to the optical assembly so as to translate an input rotational movement of the adjusting wheel into an output linear movement of the optical assembly and said optical element thereof along said first side of said support frame for compensating the ametropia of the corresponding eye of the user.

2. The HMD device of claim 1, wherein the adjusting wheel of each drive unit has a disc configuration defining a flat side at said cam interface; each of said cam mechanisms includes a spirally-shaped cam slot formed in said flat side of the adjusting wheel corresponding thereto and a cam follower in engagement with said cam slot; and, the cam follower is a single pin connected to the optical assembly to impart said output linear movement thereto as said adjusting wheel is rotated.

3. The HMD device of claim 1, wherein the deflecting element of each of said optical systems is fixedly mounted on said first side of said support frame; the cam interface of said optical system defines a plane containing said first and second windows; and, each of said optical assemblies is mounted on said first side of said support frame so as to be slideably movable thereon parallel to said plane and relative to the deflecting element corresponding thereto.

* * * * *